United States Patent
Sakuma

(10) Patent No.: US 10,419,629 B2
(45) Date of Patent: Sep. 17, 2019

(54) IMAGE READING APPARATUS AND IMAGE FORMING APPARATUS

(71) Applicant: CANON KABUSHIKI KAISHA, Tokyo (JP)

(72) Inventor: Tomofumi Sakuma, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 15/592,497

(22) Filed: May 11, 2017

(65) Prior Publication Data
US 2017/0339292 A1    Nov. 23, 2017

(30) Foreign Application Priority Data
May 18, 2016  (JP) .................... 2016-099845

(51) Int. Cl.
*G06F 15/00* (2006.01)
*H04N 1/00* (2006.01)
*H04N 1/028* (2006.01)

(52) U.S. Cl.
CPC ....... *H04N 1/00615* (2013.01); *H04N 1/0049* (2013.01); *H04N 1/00535* (2013.01); *H04N 1/00564* (2013.01); *H04N 1/00795* (2013.01); *H04N 1/02815* (2013.01)

(58) Field of Classification Search
CPC ............ H04N 1/00615; H04N 1/0049; H04N 1/00535; H04N 1/00564; H04N 1/00795; H04N 1/02815

USPC .......................................................... 358/498
See application file for complete search history.

(56) References Cited

U.S. PATENT DOCUMENTS

| 8,422,934 B2* | 4/2013 | Penke | G03G 15/5016 |
| | | | 271/215 |
| 8,988,739 B2 | 3/2015 | Oshida | H04N 1/02815 |
| 2013/0242356 A1* | 9/2013 | Oshida | H04N 1/0049 |
| | | | 358/474 |

FOREIGN PATENT DOCUMENTS

JP    2013-197725    9/2013

* cited by examiner

*Primary Examiner* — Mark R Milia
(74) *Attorney, Agent, or Firm* — Venable LLP

(57) ABSTRACT

An image reading apparatus includes a first supporting portion, a sheet conveyance portion, an image reading portion, a second supporting portion, and an illumination portion. The image reading portion is configured to read an image of the sheet conveyed by the sheet conveyance portion. The second supporting portion is disposed below the first supporting portion and configured to support the sheet whose image has been read. The illumination portion is disposed further on an outside than a sheet supporting region of the second supporting portion in a width direction perpendicular to a sheet discharge direction, configured to illuminate the second supporting portion, and provided such that a light emission direction of the illumination portion is directed to the sheet supporting region.

25 Claims, 11 Drawing Sheets

IMAGE READING APPARATUS AND IMAGE FORMING APPARATUS

BACKGROUND OF THE INVENTION

Field of the Invention

The present invention relates to an image reading apparatus and an image forming apparatus.

Description of the Related Art

Conventionally, there is an image forming apparatus, such as a digital copier, a printer, or a facsimile machine, that includes an image forming portion and an image reading apparatus, and forms an image on a sheet by the image forming portion on the basis of image information read by the image reading apparatus. There is an image reading apparatus that includes an automatic document feeder: ADF, which is an automatic document conveyance device that conveys a sheet of document supported on a supporting tray, in an upper portion of a body of the image reading apparatus.

In this image reading apparatus, a document image is read by conveying a document at a constant speed by the ADF on a predetermined image reading position on a platen glass after moving the image reading portion to a position below the image reading position. After the image is read, the document is discharged to a document discharge portion provided below a supporting tray.

Here, after the document is discharged to the document discharge portion, a user removes the document. However, there is a case where the user does not notice the document. In this case, the document is left as it is. Thus, there is an image reading apparatus configured such that the document discharge portion is illuminated by an illumination portion in order to prevent a user from forgetting to remove the document. As an example of such an image reading apparatus, there is an image reading apparatus in which an illumination portion is disposed at a position above a document discharge portion, below a supporting tray, and outside a region occupied by a discharged document of a maximum readable size in a width direction perpendicular to a discharge direction as disclosed in Japanese Patent Laid-Open No. 2013-197725. By disposing the illumination portion in such a position, light from the illumination portion can be prevented from being shielded by the document. Therefore, the visibility of the document is improved, and the user can be prevented from forgetting to remove the document.

According to a conventional image reading apparatus as described above, the user does not forget to remove the document when the user views the document discharge portion from the direction of the supporting tray in the case where the size of the document is larger than the supporting tray because the illumination portion can illuminate the document in this case. However, in the case where the size of the document is smaller than the supporting tray, the user may forget to remove the document because the illumination portion cannot illuminate the document. In this case, when a large amount of documents that are not removed are present and reading of a document is performed in this state, the remaining documents cause a jam.

SUMMARY OF THE INVENTION

According to an aspect of the present invention, an image reading apparatus includes a first supporting portion configured to support a sheet, a sheet conveyance portion configured to convey the sheet supported by the first supporting portion, an image reading portion configured to read an image of the sheet conveyed by the sheet conveyance portion, a second supporting portion disposed below the first supporting portion and configured to support the sheet whose image has been read, and an illumination portion disposed further on an outside than a sheet supporting region of the second supporting portion in a width direction perpendicular to a sheet discharge direction and configured to illuminate the second supporting portion. The illumination portion is provided such that a light emission direction of the illumination portion is directed to the sheet discharge direction.

Further features of the present invention will become apparent from the following description of exemplary embodiments with reference to the attached drawings.

DESCRIPTION OF THE EMBODIMENTS

Figure 1:
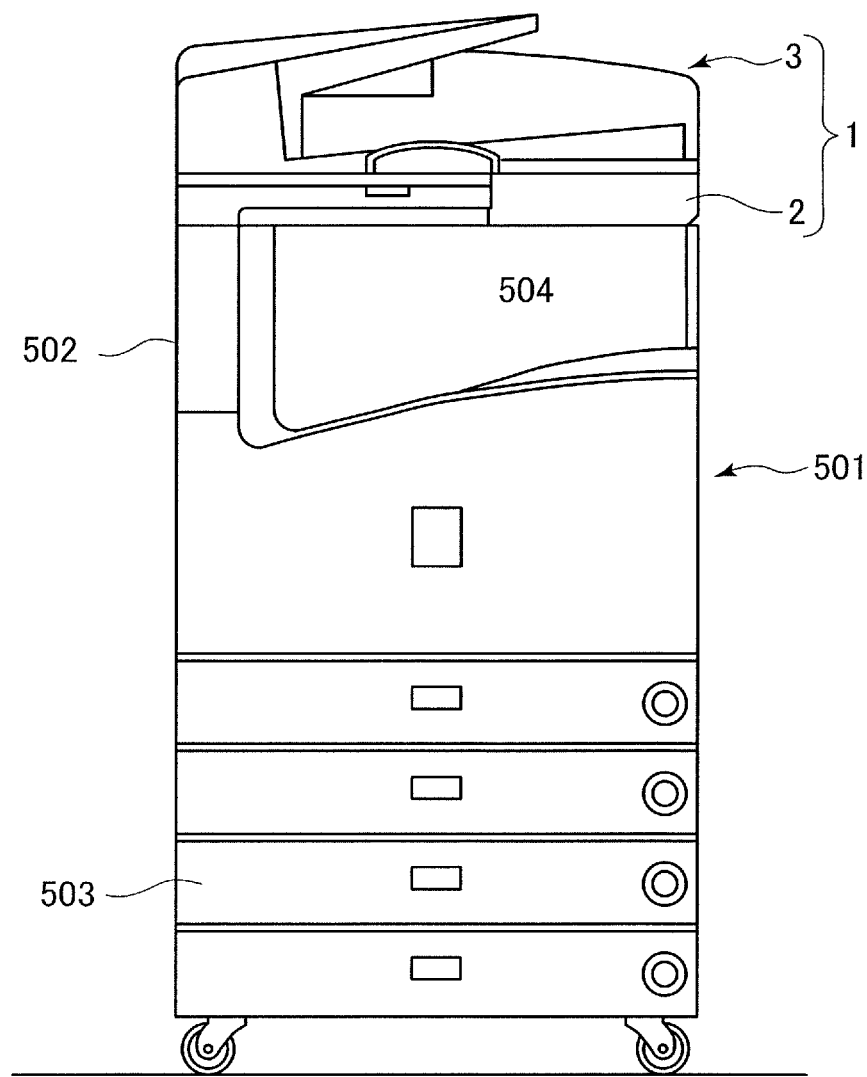
FIG. 1 is a front view of an image forming apparatus provided with an image reading apparatus according to an exemplary embodiment of the present invention.

An exemplary embodiment of the present invention will be described in detail with reference to drawings. FIG. 1 is a front view of an image reading apparatus according to an exemplary embodiment of the present invention. As illustrated in FIG. 1, an image forming apparatus 501 includes an image forming apparatus body 502 and an image reading apparatus 1 attached to an upper portion of the image forming apparatus body 502 and configured to read an image of a document sheet.

In the image forming apparatus body 502, an image forming portion is disposed in an upper portion thereof, and a sheet feed portion configured to feed a sheet accommodated in a sheet feed cassette 503 is disposed in a lower portion thereof. The image forming portion and the sheet feed portion are not illustrated. The image forming portion is configured to form an image on a sheet by using a known electrophotographic system and includes a laser writing portion, an electrophotographic process portion, a fixing portion, and so forth. The sheet feed portion includes a sheet feed roller or the like that is not illustrated for separating and conveying a sheet placed in the sheet feed cassette 503, and feeds the sheet to the image forming portion. In addition, a sheet discharge space 504 is provided between the image reading apparatus 1 and the image forming apparatus body 502, and a sheet on which an image has been formed by the image forming portion is discharged to the sheet discharge space 504 by a sheet discharge portion that is not illustrated.

The image reading apparatus 1 optically reads image information recorded on a document that is a target of reading, photoelectrically converts the image information into image data, and inputs the image data to the image forming apparatus 501. The image reading apparatus 1 includes an image reading apparatus body 2 and an ADF 3 provided in an upper portion of the image reading apparatus body 2 so as to be openable and closable. The ADF 3 is a sheet conveyance device that separates a document from plural documents and conveys the separated document to an image reading position that will be described later.

Figure 2:
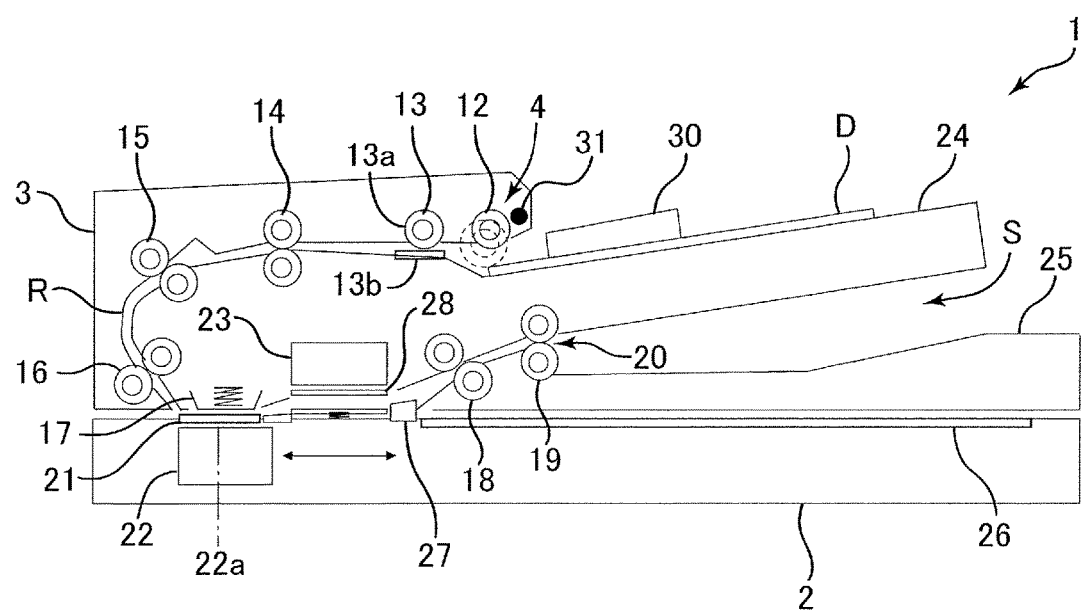
FIG. 2 illustrates a configuration of the image reading apparatus.

As illustrated in FIG. 2, a first image reading portion 22 serving as a body-side image reading portion is provided in the image reading apparatus body 2. The first image reading portion 22 includes a lamp, a reflector, and a reduced optical system that are not illustrated. The lamp irradiates the document with light, and the reduced optical system guides light reflected by the document to a photoelectrical element and reduces the light. In addition, a first platen glass 21 and a document stage glass 26 are provided in an upper surface of the image reading apparatus body 2.

The first image reading portion 22 moves parallel to the document stage glass 26 back and forth in a sub-scanning direction indicated by an arrow due to a drive from a motor that is not illustrated. In the present exemplary embodiment, the motor is controlled by a control portion 71 illustrated in FIG. 4 that will be described later so as to drive in a normal direction and a reverse direction, and causes the first image reading portion 22 to move back and forth with respect to a home position set as a standard position. When the first image reading portion 22 moves in this way, the first image reading portion 22 optically scans the document on the document stage glass 26. The motor is a stepping motor whose amount of rotation is determined by the number of input pulses, and the control portion 71 that will be described later controls the position of the first image reading portion 22 by controlling the number of pulses applied to the motor.

The ADF 3 includes a document tray 24 and a document conveyance portion 4. The document tray 24 serves as a first supporting portion configured to support a document. The document conveyance portion 4 serves as a sheet conveyance portion configured to separate a document from documents placed on the document tray and feed and convey the separated document. In addition, the ADF 3 includes a sheet discharge tray 25, a second image reading portion 23, and a document detection portion 31. The sheet discharge tray 25 serves as a second supporting portion onto which a document whose image has been read is discharged. The document detection portion 31 detects a document supported on the document tray 24. A discharge space S is provided between the document tray 24 and the sheet discharge tray 25, and a document whose image has been read is discharged to the discharge space S.

The document conveyance portion 4 includes a pickup roller 12, a separation portion 13, a first conveyance roller pair 14, a registration roller pair 15, a second conveyance roller pair 16, a third conveyance roller pair 18, a sheet discharge roller pair 19, and so forth. The pickup roller 12 is configured to send a document D placed on the document tray 24 into a conveyance path R. The separation portion 13 is configured to separate a document D from plural documents D in the case where plural documents D are fed by the pickup roller 12. The separation portion 13 is constituted by a separation roller 13a and a separation pad 13b. The separation pad 13b is disposed so as to oppose the separation roller 13a, and is in pressure contact with the separation roller 13a as a result of being urged by an urging portion that is not illustrated.

In the present exemplary embodiment, the pickup roller 12 is caused to rotate together with the separation roller 13a by a sheet feed motor M illustrated in FIG. 4 that will be described later, and sends the document D into the conveyance path R. Here, the pickup roller 12 is rotatably supported by an arm that is not illustrated and movable in an up-down direction. In a normal state, the arm is moved upward such that the pickup roller 12 is at a home position illustrated by solid lines in FIG. 2 at which the pickup roller 12 does not get in the way when placing a document D on the document tray 24. In addition, when feeding the document D, the arm is moved downward such that the pickup roller 12 moves downward from a solid line position to a broken line position illustrated in FIG. 2 while rotating, and comes into contact with an upper surface of the document D.

The registration roller pair 15 is configured to align the leading end of the document D separated by the separation portion 13 and conveyed by the first conveyance roller pair 14. The second conveyance roller pair 16 is configured to convey the document D whose leading end has been aligned by the registration roller pair 15 such that the document D passes through an image reading position 22a at which an image of the document D is read by the first image reading portion 22. The third conveyance roller pair 18 and the sheet discharge roller pair 19 are configured to discharge the document D whose image has been read onto the sheet discharge tray 25 through a sheet discharge port 20.

On the document tray 24, a pair of width direction regulation plates 30 are disposed so as to be slidable in a width direction perpendicular to a sheet conveyance direction of the document D. The position of the document D supported on the document tray 24 in the width direction is regulated by the width direction regulation plates 30, and thus the document D can be fed in a state where the position of the document D in the width direction is aligned.

The second image reading portion 23 is configured to read an image on a second surface of the document D conveyed by the document conveyance portion 4, and is disposed above the conveyance path R. In addition, a second platen glass 28 is provided at a position closer to the conveyance path R than the second image reading portion 23 is. The second image reading portion 23 reads the image on the second surface of the document D by irradiating a back surface of the document D being conveyed under the second platen glass 28 with light from a light source that is not illustrated, and then photoelectrically converting reflection light from the document D by a light receiving element and outputting an electric signal corresponding to the amount of incident light. As described above, the image reading apparatus 1 includes the second image reading portion 23 in the present exemplary embodiment, and thus the image reading apparatus 1 can read images on both surfaces of the document D by the first image reading portion 22 and the second image reading portion 23 in one cycle of document conveyance in the case where the document D is conveyed by the ADF 3.

In the present exemplary embodiment, the image reading apparatus 1 is configured to read the document D in accordance with either one of a fixed-reading mode, or a document-stage-glass document reading mode, and a feeding-reading mode, or an ADF document reading mode, selected by a user.

In the fixed-reading mode, an image of a document placed on the document stage glass 26 by a user is read by moving the first image reading portion 22 in a sub-scanning direction indicated by an arrow. The ADF 3 is supported, by a hinge portion that is disposed on the rear side of the image reading apparatus 1 and is not illustrated, so as to be pivotable upward and downward to be opened and closed with respect to the image reading apparatus body 2. The user can access the document stage glass 26 from the front side by opening the ADF 3. In the fixed-reading mode, the document is placed on the document stage glass 26 by pivoting the ADF 3 upward to expose the upper surface of the document stage glass 26. Then, the ADF 3 is closed to press the document on the document stage glass 26, and the document on the document stage glass 26 is optically scanned by moving the first image reading portion 22 back and forth with respect to the home position set as a standard position as described above with the ADF 3 being closed and thus the document on the document stage glass 26 being pressed.

In the feeding-reading mode, an image on one surface of a document or images on both surfaces of the document are read by causing the document to pass over the first image reading portion 22 and under the second image reading portion 23 by using the ADF 3. In the case of reading a document image in the feeding-reading mode, the topmost document of plural documents supported on the document tray 24 is conveyed to the separation portion 13 by the pickup roller 12. In the case where plural documents are conveyed at once, the separation portion 13 separates the topmost document from the other documents and conveys the separated document. The separated document is conveyed by the first conveyance roller pair 14 to the registration roller pair 15 that is stopped. Then, the leading end of the separated document is aligned by causing the leading end of the separated document to abut a nip portion of the stopped registration roller pair 15 to form a loop of the document.

After the leading end is aligned, the registration roller pair 15 starts rotating, and thus the document is conveyed to the second conveyance roller pair 16 and is conveyed on the first platen glass 21 by the second conveyance roller pair 16 while being guided by a platen guide 17. At this time, the first image reading portion 22 is moved to a predetermined feeding-reading position at which image information on a first surface, i.e. a front surface, of the document is read. Thus, a first-surface image of the document is read by the first image reading portion 22 when the document passes the image reading position 22a.

Next, after the first-surface image is read, the document passes under the second platen glass 28 while being guided by a jumping board 27. At this time, image information on the second surface of the document is read by the second image reading portion 23. Then, after a second-surface image of the document is read by the second image reading portion 23, the document is discharged to the discharge space S by the third conveyance roller pair 18 and the sheet discharge roller pair 19 and through the sheet discharge port 20, and is supported on the sheet discharge tray 25.

Figure 3A:
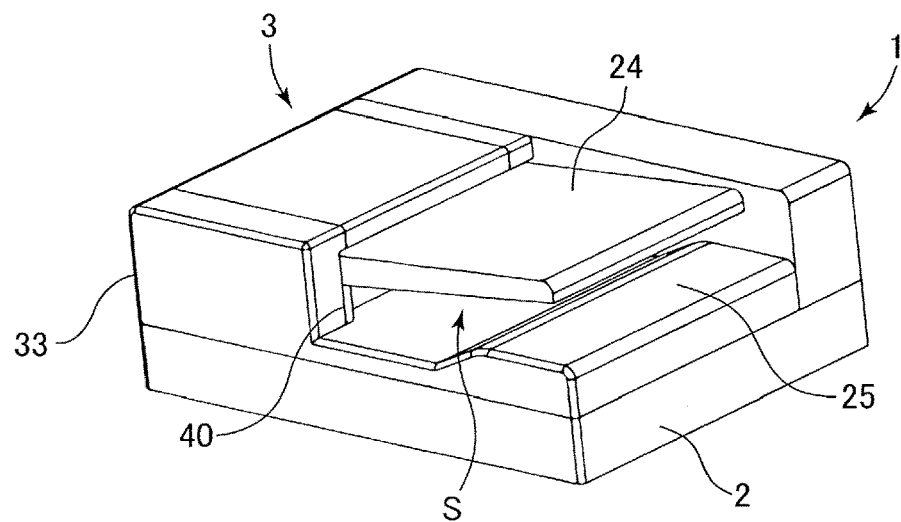
FIG. 3A is a perspective view of the image reading apparatus.
Figure 3B:
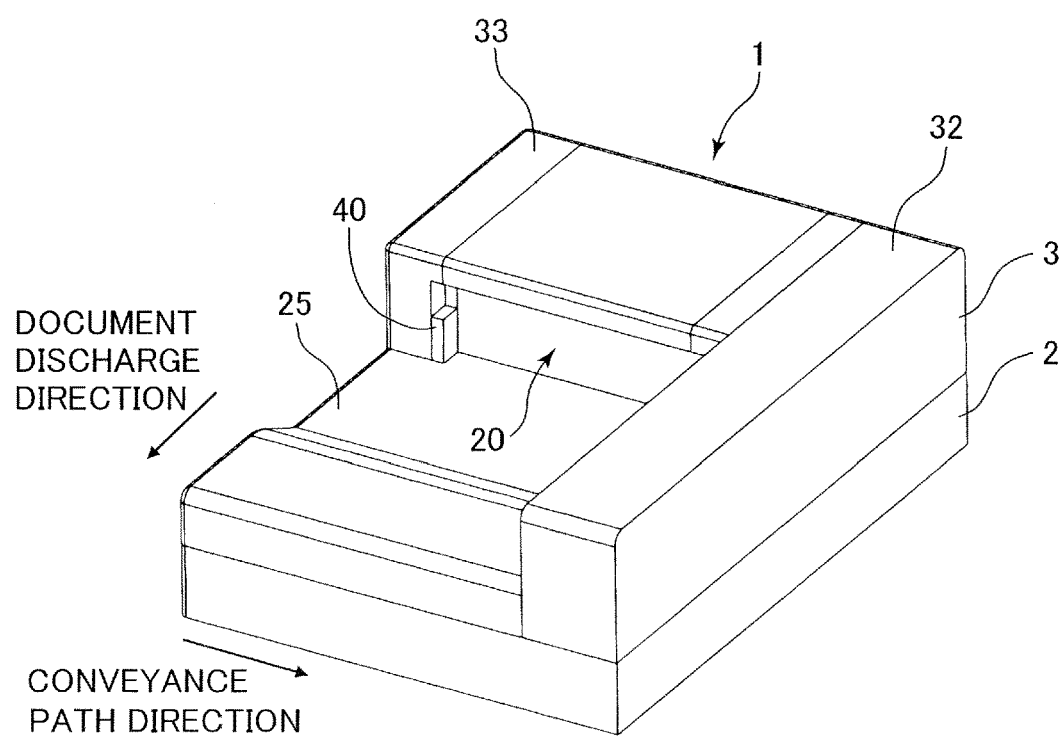
FIG. 3B is a perspective view of the image reading apparatus viewed from another direction in a state where a document tray is removed therefrom.

The image reading apparatus 1 includes a discharge tray illumination portion 40 serving as an illumination portion as illustrated in FIG. 3A, which is a perspective view of the image reading apparatus 1, and FIG. 3B, which is a perspective view of the image reading apparatus 1 viewed from another direction in a state where the document tray 24 is removed therefrom. The sheet discharge tray 25 is illuminated by the discharge tray illumination portion 40. The ADF 3 includes the sheet discharge port 20 through which the document is discharged. The discharge tray illumination portion 40 is disposed on the side opposite to a rear cover 32 in a width direction perpendicular to a document discharge direction serving as a sheet discharge direction with the sheet discharge port 20 interposed therebetween, that is, on the front side of the ADF 3.

Figure 4:
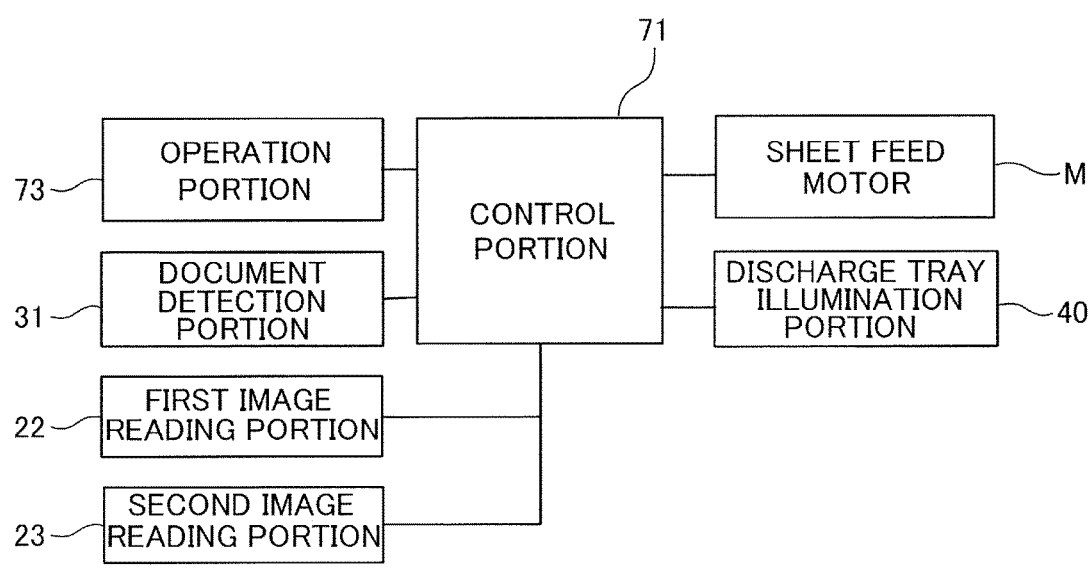
FIG. 4 is a control block diagram of the image reading apparatus.

FIG. 4 is a control block diagram of the image reading apparatus 1 according to the present exemplary embodiment. The control portion 71 controls a document image reading operation of the image reading apparatus 1, a document conveyance operation of the ADF 3, and an illumination operation of the discharge tray illumination portion 40. The control portion 71 may be provided in the image forming apparatus body 502.

The control portion 71 is connected to an operation portion 73, the document detection portion 31, the sheet feed motor M, the first image reading portion 22, the second image reading portion 23, and the discharge tray illumination portion 40. An operation signal is input through the operation portion 73. The document detection portion 31 detects whether a document D is supported on the document tray 24. In addition, the control portion 71 controls the sheet feed motor M, the first image reading portion 22, the second image reading portion 23, and the discharge tray illumination portion 40 on the basis of a detection signal from the document detection portion 31 and the signal from the operation portion 73.

Figure 5:
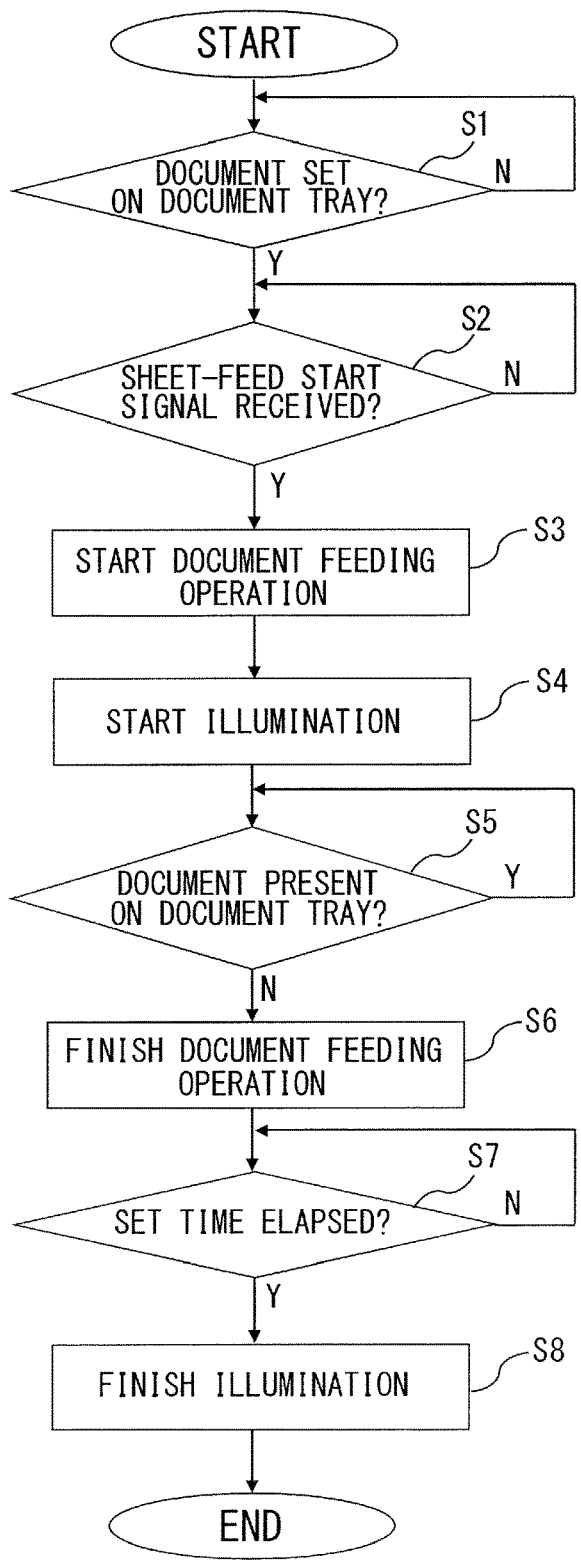
FIG. 5 is a flowchart illustrating control of the image reading apparatus in document reading.

Next, control of the control portion 71 according to the present exemplary embodiment in image reading of a document will be described with reference to FIG. 5. In S1, the control portion 71 determines whether a document D is supported, in other words, set on the document tray 24 on the basis of a detection signal from the document detection portion 31. In the case where it has been determined that the document D is supported on the document tray 24, that is, in the case where the result of determination in S1 is YES, the control portion 71 takes a stand-by state for receiving a sheet-feed start signal from the operation portion 73 and determines whether the sheet-feed start signal is received in S2. In the case where the sheet-feed start signal is received, that is, in the case where the result of determination in S2 is YES, a document feeding operation is started in S3.

After the document feeding operation is started, the control portion 71 causes the discharge tray illumination portion 40 to operate, and thereby the discharge tray illumination portion 40 starts illumination of the sheet discharge tray 25 in S4. Then, the control portion 71 determines whether a document D is present on the document tray 24 on the basis of the signal from the document detection portion 31 in S5. In the case where it has been determined that a document D is present on the document tray 24, that is, in the case where the result of the determination in S5 is YES, the document feeding operation continues. In the case where it has been determined that no document D is present on the document tray 24, that is, in the case where the result of the determination in S5 is NO, the document feeding operation is finished in S6. After the document feeding operation is finished, the control portion 71 determines whether a set time has elapsed in S7. In the case where it has been determined that the set time has elapsed, that is, in the case where the result of the determination in S7 is YES, the discharge tray illumination portion 40 finishes the illumination in S8. In this way, in the present exemplary embodiment, the discharge tray illumination portion 40 is caused to operate after the document feeding operation is started, and the discharge tray illumination portion 40 keeps on illuminating the sheet discharge tray 25 for the set time even after the document feeding operation is finished.

Figure 6:
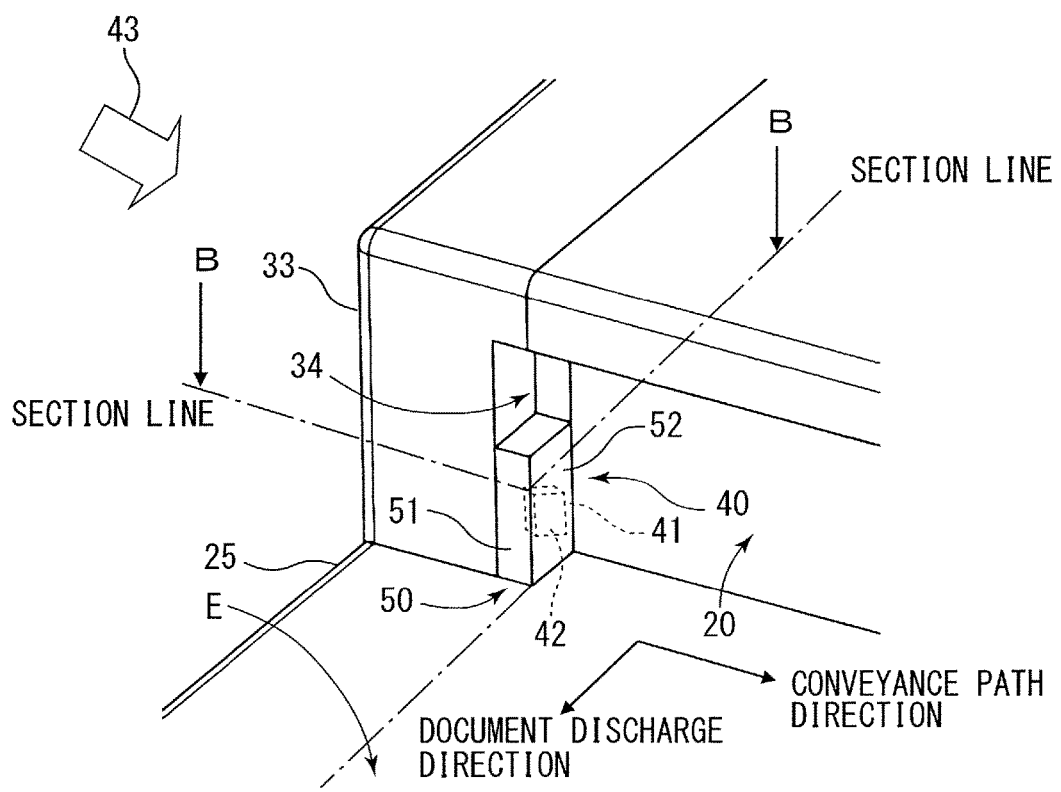
FIG. 6 is a perspective view of a discharge tray illumination portion provided in the image reading apparatus illustrating a configuration thereof.

Next, the discharge tray illumination portion 40 will be described. As illustrated in FIG. 6, the discharge tray illumination portion 40 is attached to an edge portion of the sheet discharge port 20 of the ADF 3 in a width direction outside a sheet supporting region E of the sheet discharge tray 25 in the width direction. In the present exemplary embodiment, the discharge tray illumination portion 40 is attached to a recess portion 34 defined in a position facing the sheet discharge port 20 of a downstream edge of a frame 33 in the document discharge direction serving as a sheet discharge direction. The frame 33 constitutes a side wall of the sheet discharge port 20 of the ADF 3 in the width direction. In the present exemplary embodiment, the discharge tray illumination portion 40 is disposed so as to be covered by the frame 33 and not visible when the ADF 3 is viewed from a front direction indicated by an arrow 43. However, the discharge tray illumination portion 40 may be disposed so as to project from the frame 33 if the discharge tray illumination portion 40 does not hinder visual recognition of a discharged document.

Figure 7:
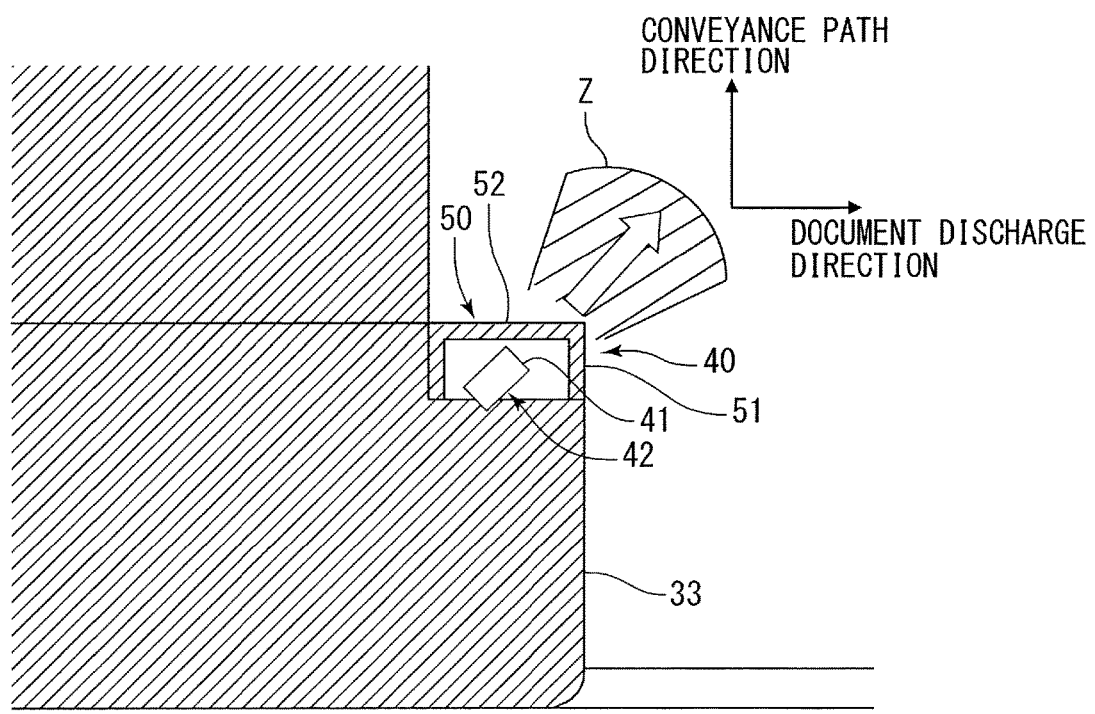
FIG. 7 is a B-B section view in FIG. 6 of the discharge tray illumination portion illustrating the configuration thereof.

In addition, as illustrated in FIG. 7, which is a B-B section view of FIG. 6, the discharge tray illumination portion 40 includes a light emitting portion 42 and a cover member 50. The light emitting portion 42 includes a light source such as a light emitting diode: LED that is not illustrated and a light emitting surface 41 through which the light from the light source is emitted. The cover member 50 is transparent and transmits light from the light emitting portion 42. The discharge tray illumination portion 40 is attached to the frame 33 such that a direction of an optical axis of the light from the light emitting portion 42 indicated by an arrow, that is, a light emission direction, is directed to the conveyance path side with respect to the document discharge direction. In other words, the discharge tray illumination portion 40 is attached to the frame 33 such that the light emission direction is directed to the discharge space S. Alternatively, this can be expressed as the direction of the optical axis of the light emitting portion 42 described above being inclined with respect to the sheet discharge direction so as to be directed to a sheet supporting region in the width direction.

According to this, the light from the light emitting portion 42 passes through a first light transmission surface 51 and a second light transmission surface 52 of the cover member 50 and enters the discharge space S from the side thereof. The first light transmission surface 51 has a flat plate shape and is disposed so as to be perpendicular to the document discharge direction. The second light transmission surface 52 is provided adjacent to the first light transmission surface 51, has a flat plate shape, and is disposed so as to be parallel to the document discharge direction. By attaching the discharge tray illumination portion 40 to the frame 33 such that the light emission direction is directed to the discharge space S in this way, the discharge space S can be illuminated from the side. In the present exemplary embodiment, the first light transmission surface 51 and the second light transmission surface 52, that is, the surface of the cover member 50, are embossed for imparting a light scattering function to the cover member 50. According to this, an illumination region Z of the discharge tray illumination portion 40 represented by a shaded area in FIG. 7 spreads in a sectorial shape.

As illustrated in FIG. 6 and the like, the first light transmission surface 51 and the second light transmission surface 52, through which light is emitted, extends in the up-down direction, that is, the vertical direction. Since the part of the discharge tray illumination portion 40 through which light is emitted extends in the vertical direction in this way, it is easily achieved that the discharge tray illumination portion 40 emits light to the discharge space S nearly horizontally. The first light transmission surface 51 and the second light transmission surface 52 serve as the part in the present exemplary embodiment.

Figure 8:
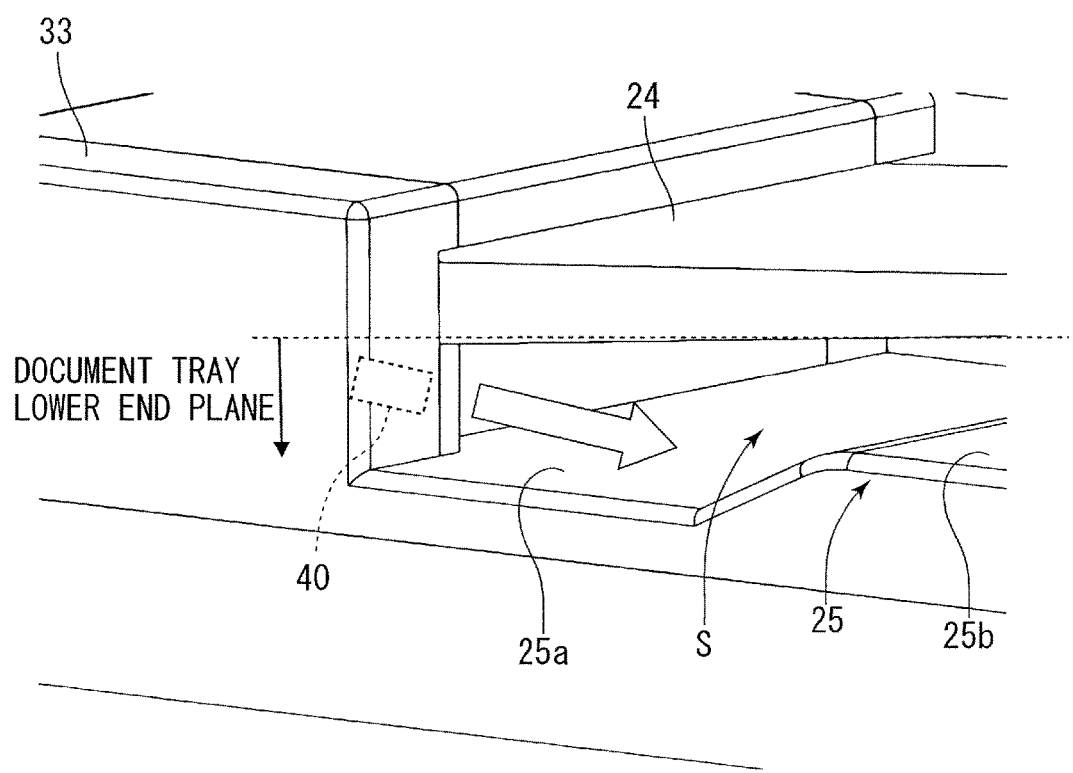
FIG. 8 is a perspective view of the image reading apparatus illustrating an illumination direction thereof.

In addition, as illustrated in FIG. 8, the discharge tray illumination portion 40 is disposed below a lower end plane of the document tray 24 in the present exemplary embodiment, and thus can illuminate a rear portion of the discharge space S in the conveyance path direction without being interrupted by the document tray 24.

In the present exemplary embodiment, the sheet discharge tray 25 includes an upstream sheet supporting surface 25a and a downstream sheet supporting surface 25b. The upstream sheet supporting surface 25a is on the upstream side of the sheet discharge tray 25, and the downstream sheet supporting surface 25b is provided downstream of the upstream sheet supporting surface 25a. By disposing the discharge tray illumination portion 40 such that the direction of the optical axis of the light from the light emitting portion 42 indicated by an arrow is substantially parallel to the upstream sheet supporting surface 25a of the sheet discharge tray 25, a further rear portion of the discharge space S in the conveyance path direction can be illuminated.

Figure 9:
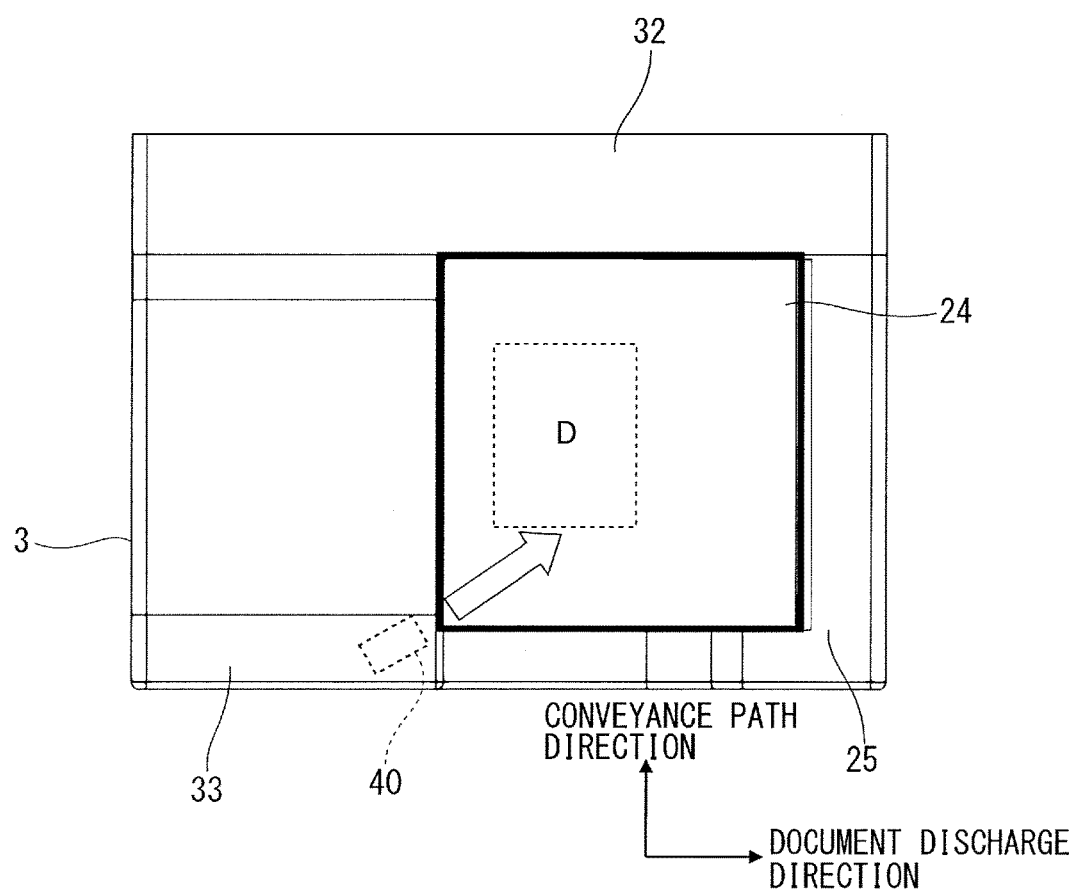
FIG. 9 is a plan view of the image reading apparatus illustrating the illumination direction of the discharge tray illumination portion.

According to this, the document D becomes easier to see, and thus the user can be prevented from forgetting to remove the document D even in the case where the size of the discharged document D is smaller than the document tray 24 indicated by thick lines in FIG. 9 and thus the discharged document D is covered by the document tray 24.

As described above, in the present exemplary embodiment, the discharge tray illumination portion 40 is attached to a position outside the sheet supporting region E of the sheet discharge tray 25 in the width direction such that the light emission direction is directed to the discharge space S. According to this, it becomes easier to see the discharged document D even in the case where the size of the discharged document D is so small that the discharged document D is covered by the document tray 24, and thus the user can visually recognize that the document D is present on the sheet discharge tray 25. As a result of this, the user can be prevented from forgetting to remove the document D.

Figure 10:
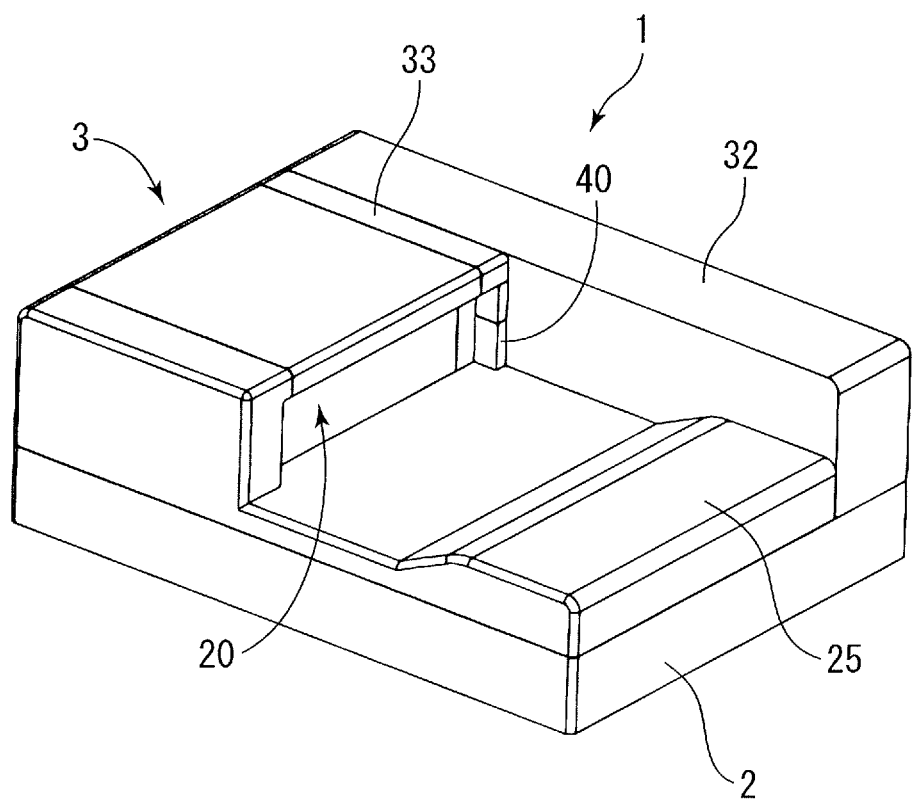
FIG. 10 illustrates another attaching position of the discharge tray illumination portion.
Figure 11:
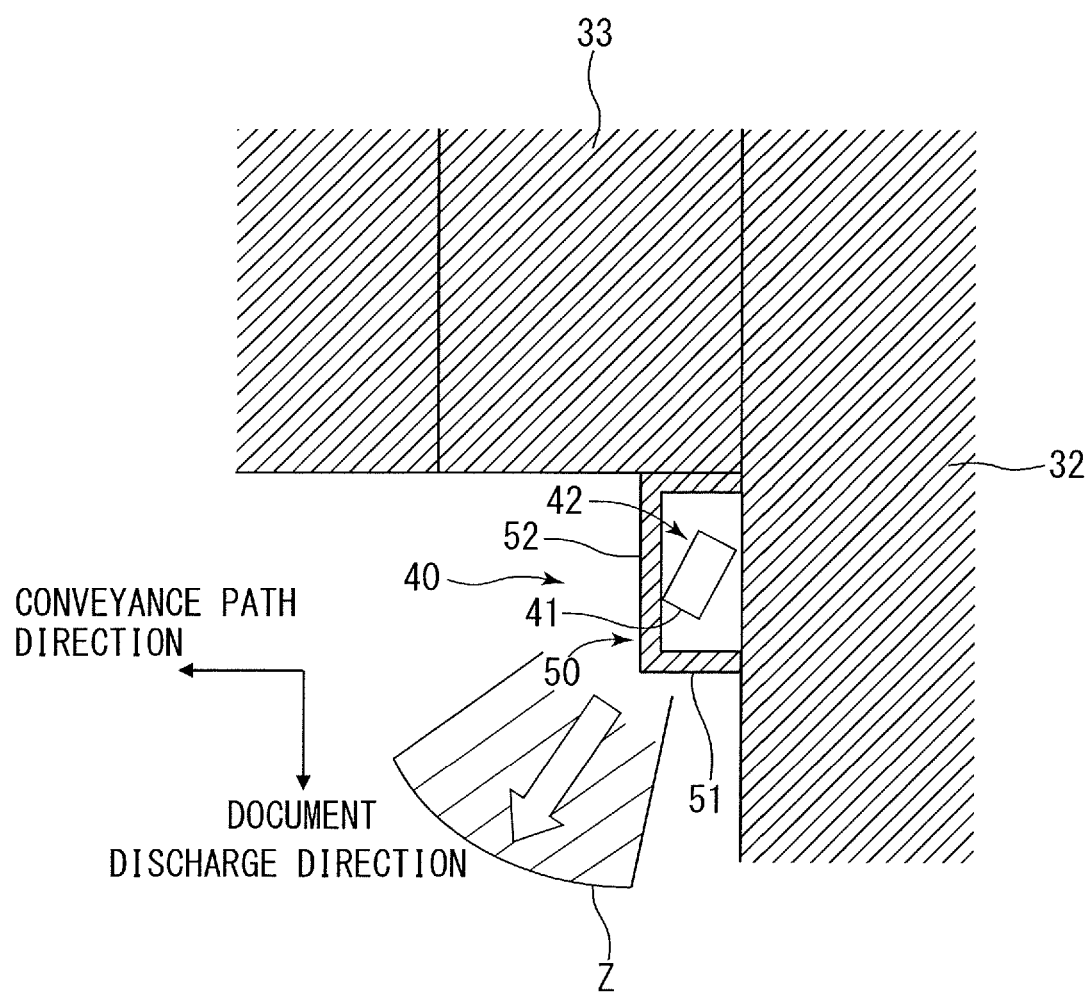
FIG. 11 is a plan view of the image reading apparatus illustrating the illumination direction of the discharge tray illumination portion attached to the other attaching position.

The case where the discharge tray illumination portion 40 is disposed on the front side of the ADF 3 has been described above. However, the present invention is not limited to this embodiment. For example, as illustrated in FIGS. 10 and 11, the discharge tray illumination portion 40 may be disposed on the rear side, that is, the rear cover 32 side, of the ADF 3. In addition, although the case where the cover member 50 includes two light transmission surfaces 51 and 52 that each have a flat plate shape and are perpendicular to each other as light transmission surfaces has been described above, the present invention is not limited to this embodiment.

The light transmission surfaces of the cover member 50 may not be perpendicular to each other as long as at least one surface is provided in such an angle as to be directed to the conveyance path. In other words, the cover member 50 may include a first light transmission surface and a second light transmission surface disposed downstream in the sheet discharging direction, and having a larger angle in a direction away from the space with respect to the sheet discharging direction than that of the first light transmission surface. For example, the cover member 50 may include plural light transmission surfaces formed in such angles that a more downstream light transmission surface is directed more downstream in the document discharge direction. In addition, instead of a flat-shaped light transmission surface, the cover member 50 may include a light transmission surface curved such that a more downstream portion thereof in the sheet discharge direction is directed further away from the space. For example, a light transmission surface curved such that a more downstream portion thereof in the sheet discharge direction is directed more downstream in the sheet discharge direction than a more upstream portion thereof in the sheet discharge direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-099845, filed May 18, 2016, which is hereby incorporated by reference herein in its entirety.

What is claimed is:

1. An image reading apparatus comprising:
   a first supporting portion configured to support a sheet;
   a sheet conveyance portion configured to convey the sheet supported by the first supporting portion;
   an image reading portion configured to read an image of the sheet conveyed by the sheet conveyance portion;
   a sheet discharging portion configured to discharge the sheet, whose image has been read, in a discharging direction;
   a second supporting portion disposed below the first supporting portion and configured to support the sheet discharged by the sheet discharging portion;
   a light emitting portion configured to emit light; and
   a transparent cover member configured to transmit the light from the light emitting portion and disposed on a surface of the image reading apparatus that intersects a width direction, the width direction being perpendicular to the discharging direction and parallel to a horizontal direction,
   wherein the light emitted from the light emitting portion illuminates the second supporting portion through the transparent cover member.

2. The image reading apparatus according to claim 1, further comprising:
   an attachment portion to which the transparent cover member is attached; and
   a sheet discharge port through which the sheet whose image has been read is discharged,
   wherein the attachment portion is provided at an edge portion of the sheet discharge port in the width direction.

3. The image reading apparatus according to claim 2, wherein the attachment portion is provided at a recess portion disposed at a downstream end of a frame body in the discharging direction, the frame body forming a side wall of the sheet discharge port in the width direction.

4. The image reading apparatus according to claim 1, wherein the light emitting portion and the transparent cover member are attached to a position below the first supporting portion.

5. The image reading apparatus according to claim 1, wherein the light emitting portion is disposed such that an optical axis of the light from the light emitting portion is substantially parallel to a sheet supporting surface of the second supporting portion, the sheet discharged by the sheet discharging portion being stacked on the sheet supporting surface.

6. The image reading apparatus according to claim 1, wherein the light emitting portion is disposed such that an optical axis thereof is inclined with respect to the discharging direction so as to be directed to a sheet supporting region, of the second supporting portion, in the width direction, the sheet discharged by the sheet discharging portion being stacked on the sheet supporting region.

7. The image reading apparatus according to claim 1, wherein the transparent cover member is embossed.

8. The image reading apparatus according to claim 1, wherein a part of the transparent cover member extends in a vertical direction.

9. The image reading apparatus according to claim 1, wherein the surface on which the transparent cover member is disposed is on a front side of the image reading apparatus, and the light emitted from the light emitting portion illuminates the second supporting portion from the front side.

10. The image reading apparatus according to claim 1, wherein the transparent cover member is disposed out of an area of the second supporting portion in the width direction, the area being an area where the sheet discharged by the sheet discharging portion is stacked.

11. A sheet supporting apparatus comprising:
    a sheet conveyance portion configured to convey a sheet;
    a sheet discharging portion configured to discharge the sheet which has been conveyed by the sheet conveyance portion in a discharging direction;
    a supporting portion configured to support the sheet discharged by the sheet discharged portion;
    a light emitting portion configured to emit light; and
    a transparent cover member configured to transmit the light from the light emitting portion and disposed on a surface of the sheet supporting apparatus that intersects a width direction, the width direction being perpendicular to the discharging direction and parallel to a horizontal direction,
    wherein the light emitted from the light emitting portion illuminates the supporting portion through the transparent cover member.

12. The sheet supporting apparatus according to claim 11, wherein the surface on which the transparent cover member is disposed is on a front side of the sheet supporting apparatus, and the light emitted from the light emitting portion illuminates the supporting portion from the front side.

13. The sheet supporting apparatus according to claim 11, wherein the transparent cover member is disposed out of an area of the supporting portion in the width direction, the area being an area where the sheet discharged by the sheet discharging portion is stacked.

14. An image forming apparatus comprising:
    a first supporting portion configured to support a sheet;
    a sheet conveyance portion configured to convey the sheet supported by the first supporting portion;
    an image reading portion configured to read an image of the sheet conveyed by the sheet conveyance portion;

an image forming unit configured to form an image based on image information read by the image reading portion;
a sheet discharging portion configured to discharge the sheet whose image has been read in a discharging direction;
a second supporting portion disposed below the first supporting portion and configured to support the sheet discharged by the sheet discharging portion;
a light emitting portion configured to emit light; and
a transparent cover member configured to transmit the light from the light emitting portion and disposed on a surface of the image forming apparatus that intersects a width direction, the width direction being perpendicular to the discharging direction and parallel to a horizontal direction,
wherein the light emitted from the light emitting portion illuminates the second supporting portion through the transparent cover member.

15. An image reading apparatus comprising:
a first supporting portion configured to support a sheet;
a sheet conveyance portion configured to convey the sheet supported by the first supporting portion;
an image reading portion configured to read an image of the sheet conveyed by the sheet conveyance portion;
a sheet discharging portion configured to discharge the sheet, whose image has been read, in a discharging direction;
a second supporting portion disposed below the first supporting portion and configured to support the sheet discharged by the sheet discharging portion whose image has been read;
a light emitting portion configured to emit light;
a transparent cover member configured to transmit the light from the light emitting portion and disposed adjacent to a surface of the image reading apparatus, wherein the surface intersects the discharging direction,
wherein the light emitted from the light emitting portion illuminates the second supporting portion through the transparent cover member.

16. The image reading apparatus according to claim 15, wherein the transparent cover member is disposed out of an area of the second supporting portion in a width direction perpendicular to the discharging direction and parallel to a horizontal direction, the area being an area where the sheet discharged by the sheet discharging portion is stacked.

17. The image reading apparatus according to claim 15, further comprising:
a sheet discharge port through which the sheet whose image has been read is discharged,
wherein the surface is provided below the sheet discharge port and intersects a sheet supporting surface of the second supporting portion, the sheet discharged by the sheet discharging portion being stacked on the sheet supporting surface.

18. The image reading apparatus according to claim 15, wherein the transparent cover member is embossed.

19. The image reading apparatus according to claim 15, wherein a part of the transparent cover member extends in a vertical direction.

20. The image reading apparatus according to claim 15, wherein the surface on which the transparent cover member is disposed is on a front side of the image reading apparatus, and the light emitted from the light emitting portion illuminates the second supporting portion from the front side.

21. A sheet supporting apparatus comprising:
a sheet conveyance portion configured to convey a sheet;
a sheet discharging portion configured to discharge the sheet which has been conveyed by the sheet conveyance portion in a discharging direction;
a supporting portion configured to support the sheet discharged by the sheet discharged portion;
a light emitting portion configured to emit light;
a transparent cover member configured to transmit the light from the light emitting portion and disposed adjacent to a surface of the sheet supporting apparatus, wherein the surface intersects the discharging direction,
wherein the light emitted from the light emitting portion illuminates the supporting portion through the transparent cover member.

22. The sheet supporting apparatus according to claim 21, wherein the transparent cover member is disposed out of an area of the supporting portion in a width direction perpendicular to the discharging direction and parallel to a horizontal direction, the area being an area where the sheet discharged by the sheet discharging portion is stacked.

23. The sheet supporting apparatus according to claim 21, further comprising:
a sheet discharge port through which the sheet is discharged,
wherein the surface is provided below the sheet discharge port and intersects a sheet supporting surface of the supporting portion, the sheet discharged by the sheet discharging portion being stacked on the sheet supporting surface.

24. The sheet supporting apparatus according to claim 21, wherein the surface on which the transparent cover member is disposed is on a front side of the sheet supporting apparatus, and the light emitted from the light emitting portion illuminates the supporting portion from the front side.

25. An image forming apparatus comprising:
a first supporting portion configured to support a sheet;
a sheet conveyance portion configured to convey the sheet supported by the first supporting portion;
an image reading portion configured to read an image of the sheet conveyed by the sheet conveyance portion;
an image forming unit configured to form an image based on image information read by the image reading portion;
a sheet discharging portion configured to discharge the sheet whose image has been read in a discharging direction;
a second supporting portion disposed below the first supporting portion and configured to support the sheet discharged by the sheet discharging portion;
a light emitting portion configured to emit light;
a transparent cover member configured to transmit the light from the light emitting portion and disposed adjacent to a surface of the image forming apparatus, wherein the surface intersects the discharging direction,
wherein the light emitted from the light emitting portion illuminates the second supporting portion through the transparent cover member.

* * * * *